United States Patent
Ohashi

(10) Patent No.: US 8,472,078 B2
(45) Date of Patent: Jun. 25, 2013

(54) IMAGE PROCESSING APPARATUS FOR DETERMINING WHETHER A REGION BASED ON A COMBINED INTERNAL REGION IS A TABLE REGION

(75) Inventor: Yoshinori Ohashi, Ichikawa (JP)

(73) Assignee: Canon Kabushiki Kaisha, Tokyo (JP)

(*) Notice: Subject to any disclaimer, the term of this patent is extended or adjusted under 35 U.S.C. 154(b) by 740 days.

(21) Appl. No.: 12/485,803

(22) Filed: Jun. 16, 2009

(65) Prior Publication Data

US 2009/0316219 A1 Dec. 24, 2009

(30) Foreign Application Priority Data

Jun. 18, 2008 (JP) .................. 2008-159319

(51) Int. Cl.
*H04N 1/40* (2006.01)
*H04N 1/38* (2006.01)
*G06K 9/00* (2006.01)

(52) U.S. Cl.
USPC .............. 358/2.1; 358/450; 382/176

(58) Field of Classification Search
None
See application file for complete search history.

(56) References Cited

U.S. PATENT DOCUMENTS

| 5,680,479 A * | 10/1997 | Wang et al. | 382/176 |
| 7,003,159 B2 * | 2/2006 | Yamaai | 382/199 |
| 2005/0238257 A1 * | 10/2005 | Kaneda et al. | 382/305 |
| 2009/0148042 A1 * | 6/2009 | Fan et al. | 382/176 |

FOREIGN PATENT DOCUMENTS

| JP | 2001-134712 A | 5/2001 |
| JP | 2001-331763 A | 11/2001 |

* cited by examiner

*Primary Examiner* — Barbara Reinier
(74) *Attorney, Agent, or Firm* — Canon USA Inc. IP Division

(57) ABSTRACT

An image processing apparatus includes a region segmentation unit configured to perform region segmentation based on a black pixel connected region in a document image, a selection unit configured to select a processing target region from regions segmented by the region segmentation unit, an internal region combining unit configured to generate a combined internal region by combining internal regions which are included in the regions selected by the selection unit and satisfy a predetermined condition, a table region determination unit configured to determine whether a region based on the combined internal region obtained by the internal region combining unit is a table region, and an extraction unit configured to extract the region determined by the table region determination unit as a table region.

15 Claims, 17 Drawing Sheets

FIG. 3

FIG. 13A
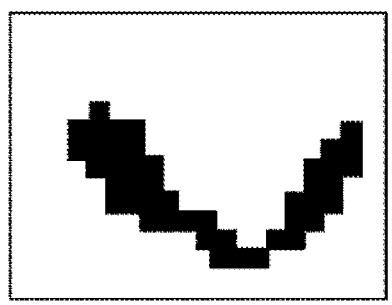
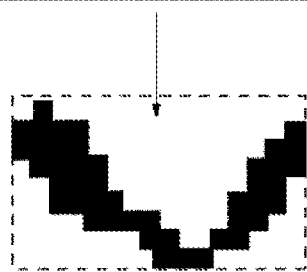
FIG. 13B
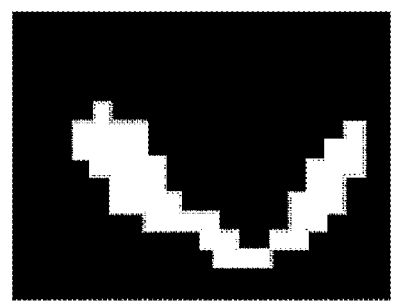
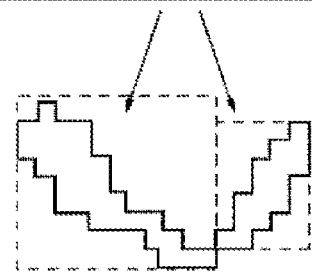

FIG. 14A   FRAME
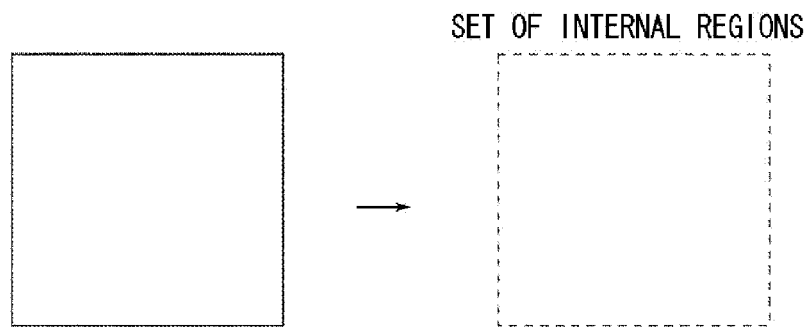
FIG. 14B   TABLE
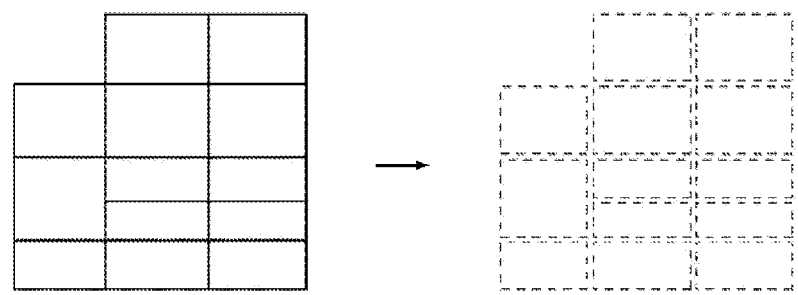
FIG. 14C   NON-CHARACTER (FIGURE)
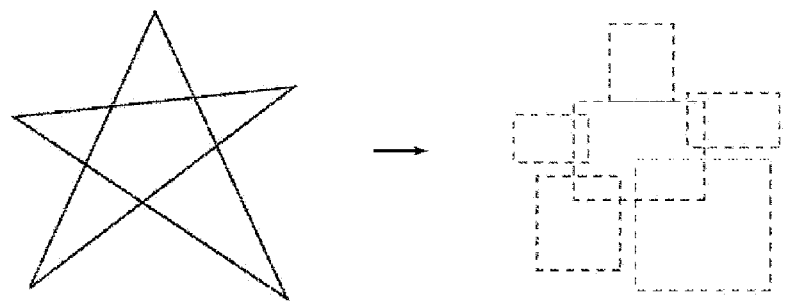

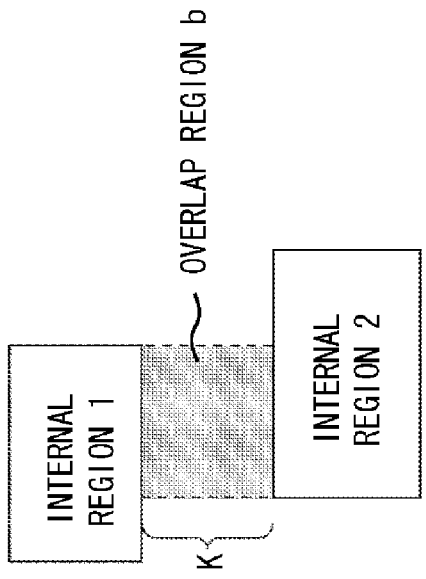
FIG. 17A  INTERNAL REGIONS OVERLAP IN VERTICAL DIRECTION
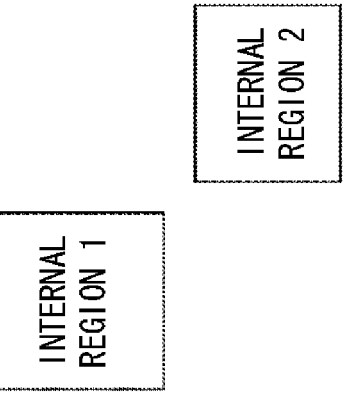
FIG. 17B  INTERNAL REGIONS OVERLAP IN HORIZONTAL DIRECTION
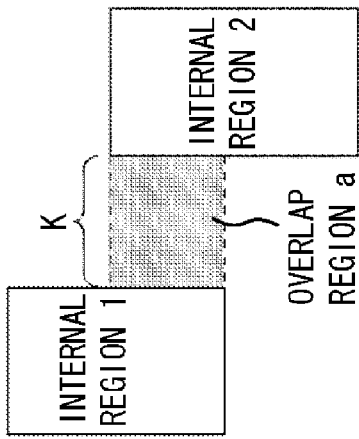
FIG. 17C  INTERNAL REGIONS OVERLAP IN BOTH DIRECTIONS
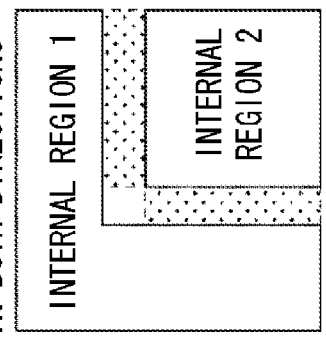
FIG. 17D  EXAMPLE OF NON-OVERLAP

IMAGE PROCESSING APPARATUS FOR DETERMINING WHETHER A REGION BASED ON A COMBINED INTERNAL REGION IS A TABLE REGION

BACKGROUND OF THE INVENTION

1. Field of the Invention

The present invention relates to an apparatus, a method, and a storage medium for extracting a table region from a document image.

2. Description of the Related Art

Hitherto, there have been region segmentation techniques for analyzing a document image and segmenting the document image into regions classified according to attributes, such as "text", "graphics", "line-drawing", and "table". U.S. Pat. No. 5,680,479 discusses such a region segmentation technique. According to this region segmentation technique, first, a black pixel connected component is extracted from a binarized document image by performing 8-direction contour tracing of black pixels. Then, a white pixel connected component (hereinafter referred to as an internal region) is extracted from the black pixel connected component by performing 4-direction contour tracing of white pixels. Finally, the binarized document image is segmented into regions classified according to the attributes, such as "text", "graphics", and "table".

Each of the attributes of the segmented regions can be used to determine a type of processing, such as optical character recognition (OCR), data compression, data routing, or data extraction, to be subsequently performed on an image formed in each of the regions. For example, the OCR processing is performed on an image formed in the text region. However, the OCR processing is not performed on images formed in a picture region, a figure region, and the like. Thus, an image processing apparatus can be configured so that even when a plurality of different types of document images are input thereto utilizing such a system, the input images are automatically processed without operator's intervention.

When the region segmentation technique discussed in U.S. Pat. No. 5,680,479 is applied to a document image illustrated in FIG. 3, a result of the region segmentation is obtained, as illustrated in FIG. 4. A title region, a horizontal line region, a text region, a picture region, a figure region, a frame region, a table region, and the like included in the document image illustrated in FIG. 3 are separated and grouped according to the types (or attributes) of the regions. Thus, each region is extracted, as illustrated in FIG. 4.

On the other hand, when region segmentation processing is performed, sometimes, a region cannot exactly be extracted. For example, when a table and a title are located closely to each other, as illustrated in FIG. 5, black pixels representing the table are connected to black pixels representing the title on a scanned image depending on a scanning condition or a printing condition. In such a case, there is a fear that a region indicated with dashed lines 501 may be regarded as one black pixel connected region (an area of black pixel connected component), and that the title may be identified as a ruled line portion of the table without being identified as a text region.

In the case of a document image in which a table is connected to another element, e.g., the figure of an arrow, as illustrated in FIG. 8, a black pixel connected component is a region 801 in which a table portion is connected to a figure portion. On the other hand, white pixel connected components in the region 801 are irregularly arranged. Thus, the region 801 is not identified as a table region. More particularly, in the case where black pixels other than the tables are connected to one another, as illustrated in FIGS. 5 and 8, sometimes, an error occurs in the extraction of a table region, or a failure occurs in identifying a region as a table region.

SUMMARY OF THE INVENTION

The present invention is directed to an image processing apparatus capable of accurately extracting a table region from a document image.

According to an aspect of the present invention, an image processing apparatus includes a region segmentation unit configured to perform region segmentation based on a black pixel connected region in a document image, a selection unit configured to select a processing target region from regions segmented by the region segmentation unit, an internal region combining unit configured to generate a combined internal region by combining internal regions which are included in the regions selected by the selection unit and satisfy a predetermined condition, a table region determination unit configured to determine whether a region based on the combined internal region obtained by the internal region combining unit is a table region, and an extraction unit configured to extract the region determined by the table region determination unit as a table region.

According to the present invention, a table region can more accurately be extracted from a document image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

Figure 3:
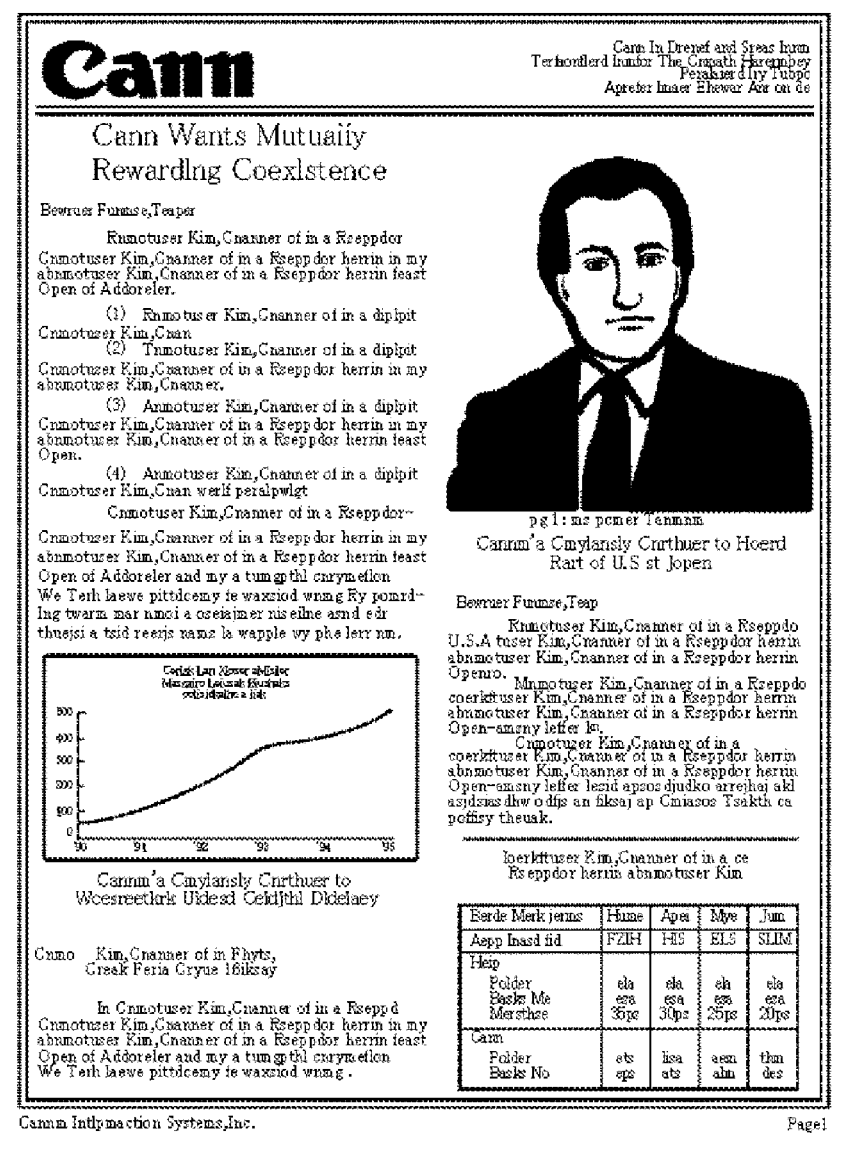

FIG. 3 illustrates an example of a document image.

FIG. 13A illustrates an example of an 8-connected region of black pixels. FIG. 13B illustrates an example of a 4-connected region of white pixels.

FIGS. 14A, 14B, and 14C illustrate examples of a set of 4-connected regions of internal white pixels.

FIGS. 17A, 17B, 17C, and 17D illustrate examples of an overlap between internal regions.

DETAILED DESCRIPTION OF THE EMBODIMENTS

Various exemplary embodiments, features, and aspects of the invention will be described in detail below with reference to the drawings.

Figure 1:
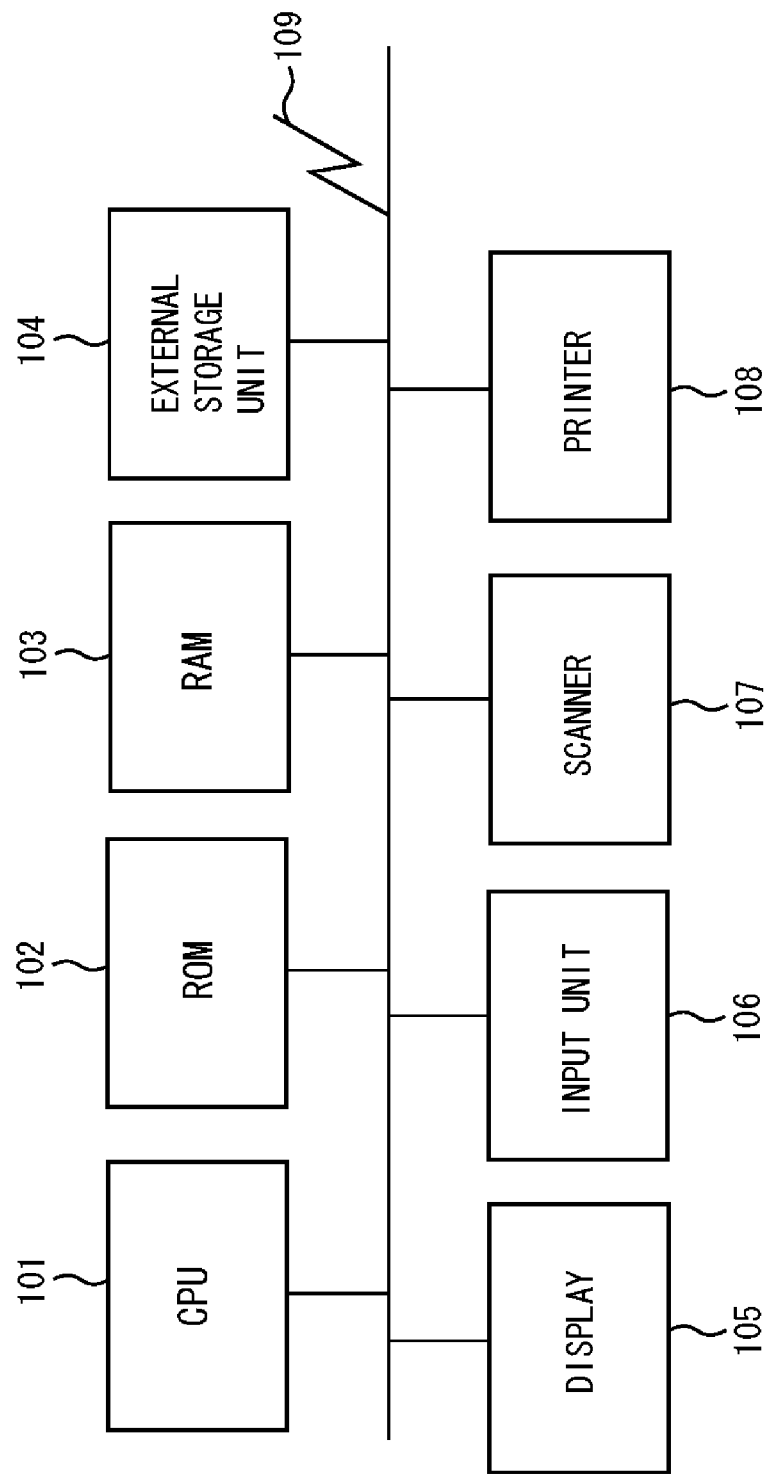
FIG. 1 illustrates a configuration of an image processing apparatus according to an exemplary embodiment of the present invention.

FIG. 1 is a block diagram illustrating a configuration of an image processing apparatus according to an exemplary embodiment of the present invention. A central processing unit (CPU) 101 controls the entire image processing apparatus by executing a computer program stored in a read-only memory (ROM) 102. The CPU 101 performs processing illustrated by each flowchart described below. That is, the computer (i.e., the CPU 101) functions as a processing unit for executing the computer program to perform processing to be described below. The ROM 102 stores control programs for causing the computer to perform the processing illustrated in the flowchart to be described below, and various parameters.

A random access memory (RAM) 103 stores images and various data. The RAM 103 functions as a work area for processing data, and a temporary save area for temporarily storing data. Each external storage unit 104 stores various data such as a database for managing images. The external storage unit 104 includes a computer-readable storage medium, such as a hard disk, a compact disk read-only memory (CD-ROM) and can be configured to store the above computer programs. A display 105 is a display unit such as a liquid crystal display (LCD) and a cathode-ray tube (CRT).

An input unit 106 includes, e.g., a mouse and a pen tablet and can input a user's instruction. A scanner 107 can input a color image and is an image input unit for optically reading an image (e.g., a document) and for acquiring image data representing the read image. A printer 108 performs printing of image data or the like, on which predetermined image processing is performed.

The present invention can be implemented by a general-purpose computer. In this case, the system can be configured so that control programs stored in a storage medium is preliminarily stored in the external storage unit 104, and the programs can be read and executed by the CPU 101.

A network interface (I/F) 109 communicates with an external unit (e.g., a server or an external storage unit) connected to the network. The network I/F 109 is utilized when a program and data are read or written. The network is a communication network, such as the Internet, a local area network (LAN), a wide area network (WAN), a telephone circuit, a radio circuit, an automated teller machine (ATM), a frame relay circuit, and a cable television circuit.

The scanner 107 and the printer 108 can be connected via the network I/F 109.

Figure 2:
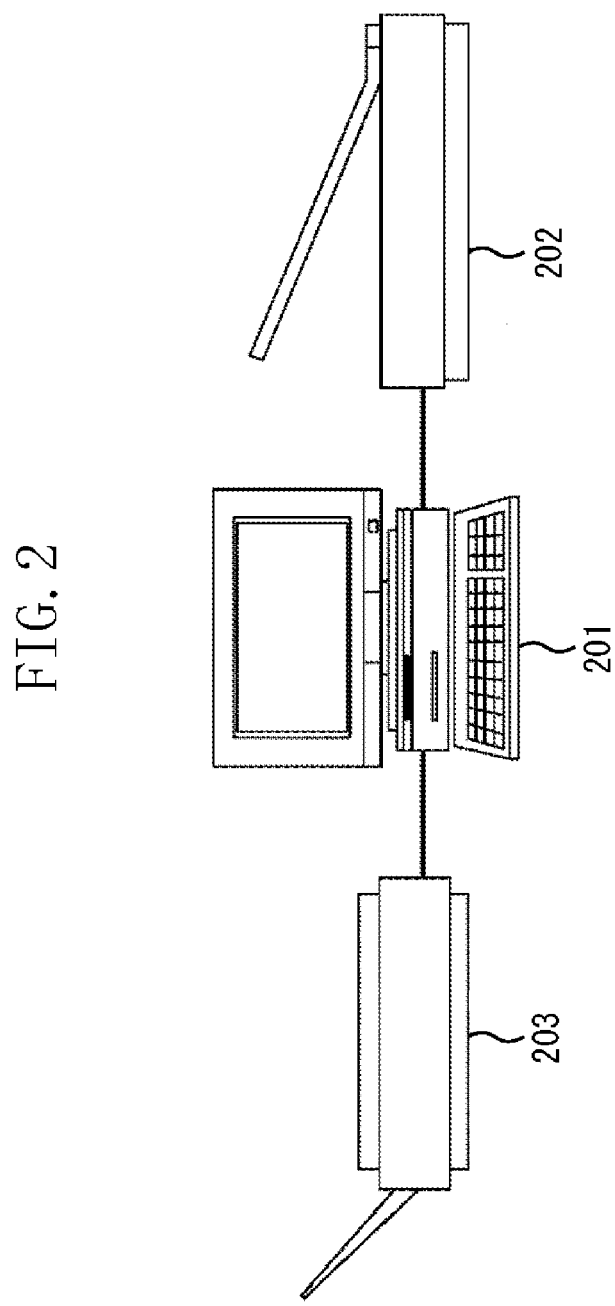
FIG. 2 illustrates an example of a system implementing the image processing apparatus according to the exemplary embodiment of the present invention.
Figure 4:
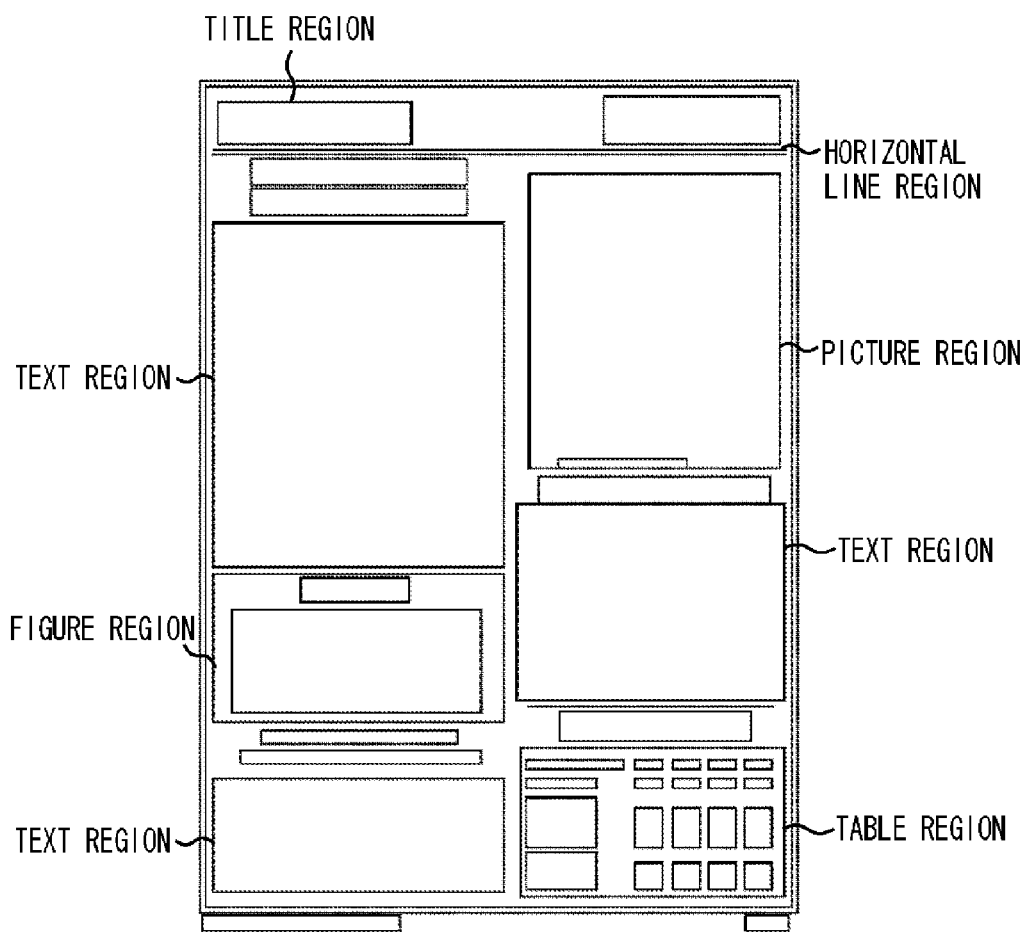
FIG. 4 illustrates a result of region segmentation of the document image illustrated in FIG. 3.

Such an image processing apparatus is implemented by, e.g., a system illustrated in FIG. 2 which illustrates an example of a computer system that can be employed in the present embodiment. This computer system includes a computer unit 201, a scanner 202, and a printer 203. The computer unit 201 illustrated in this figure performs predetermined image processing. The scanner 202 optically reads an original document and computerizes the read original document to obtain image data. Then, the scanner 202 sends the image data to the computer unit 201. The printer 203 prints image data on which predetermined image processing is performed. Although a form is read using the scanner 202 in the present embodiment, a form can be computerized using, for example, a digital camera to obtain image data.

Figure 11:
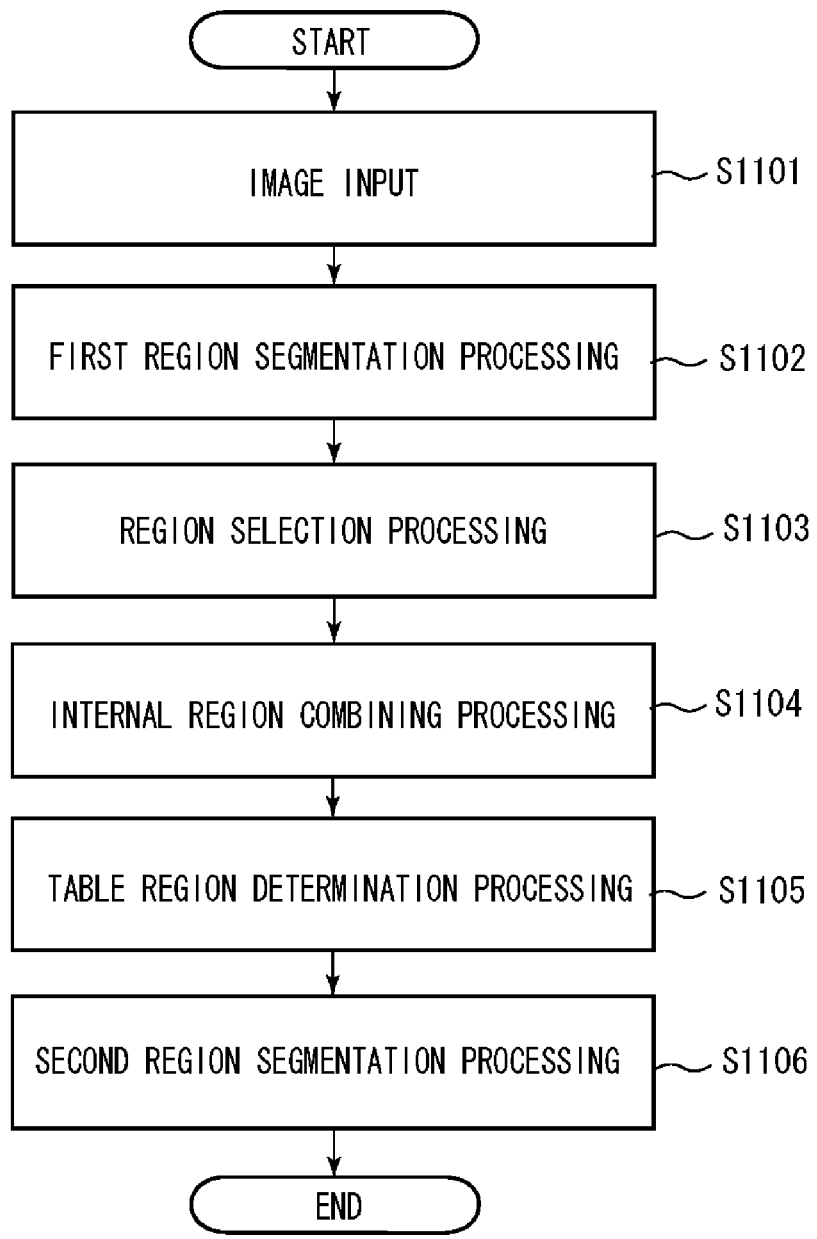
FIG. 11 illustrates an image processing procedure according to the exemplary embodiment of the present invention.

Hereinafter, an operation of the image processing apparatus having the above configuration according to the present embodiment is described. FIG. 11 is a flowchart illustrating an outline of a procedure for performing image processing according to the present embodiment.

In step S1101, the CPU 101 converts a document image, which is obtained by reading a paper document with the scanner, into a binary image. In step S1102, the CPU 101 performs region segmentation processing on the binary image. Each element on the document image is extracted as a region. The region segmentation technique discussed in, e.g., U.S. Pat. No. 5,680,479 is utilized in the region segmentation processing performed in this step. The details of the region segmentation processing are described below.

In step S1103, the CPU 101 selects a processing target area. According to the present embodiment, among regions extracted in step S1102, a table region, a frame region, and a non-character region which has a plurality of internal regions (connected regions of white pixels) are selected as the processing target area.

Figure 6:
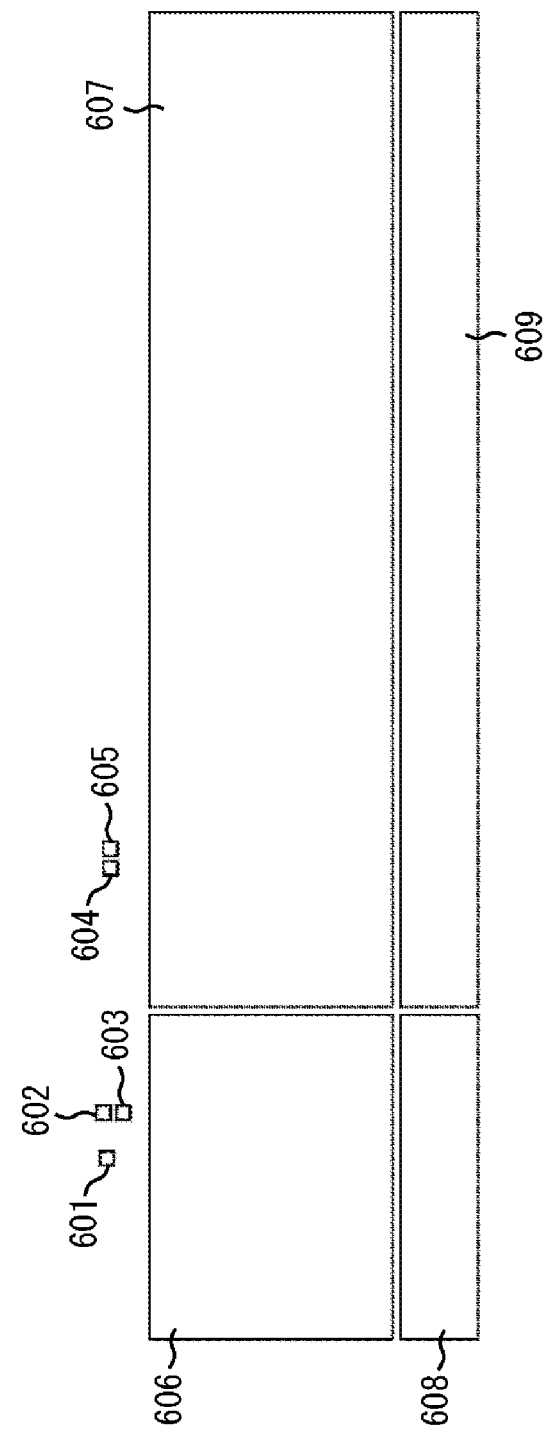
FIG. 6 illustrates internal regions included in the table image illustrated in FIG. 5.
Figure 7:
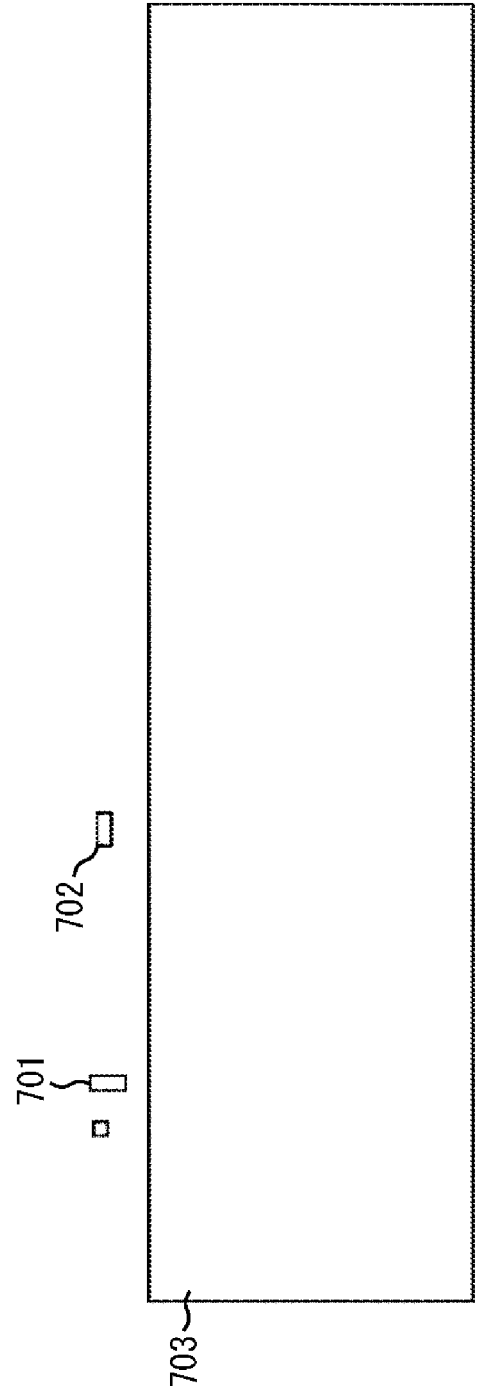
FIG. 7 illustrates a result of combining the internal regions illustrated in FIG. 6.
Figure 8:
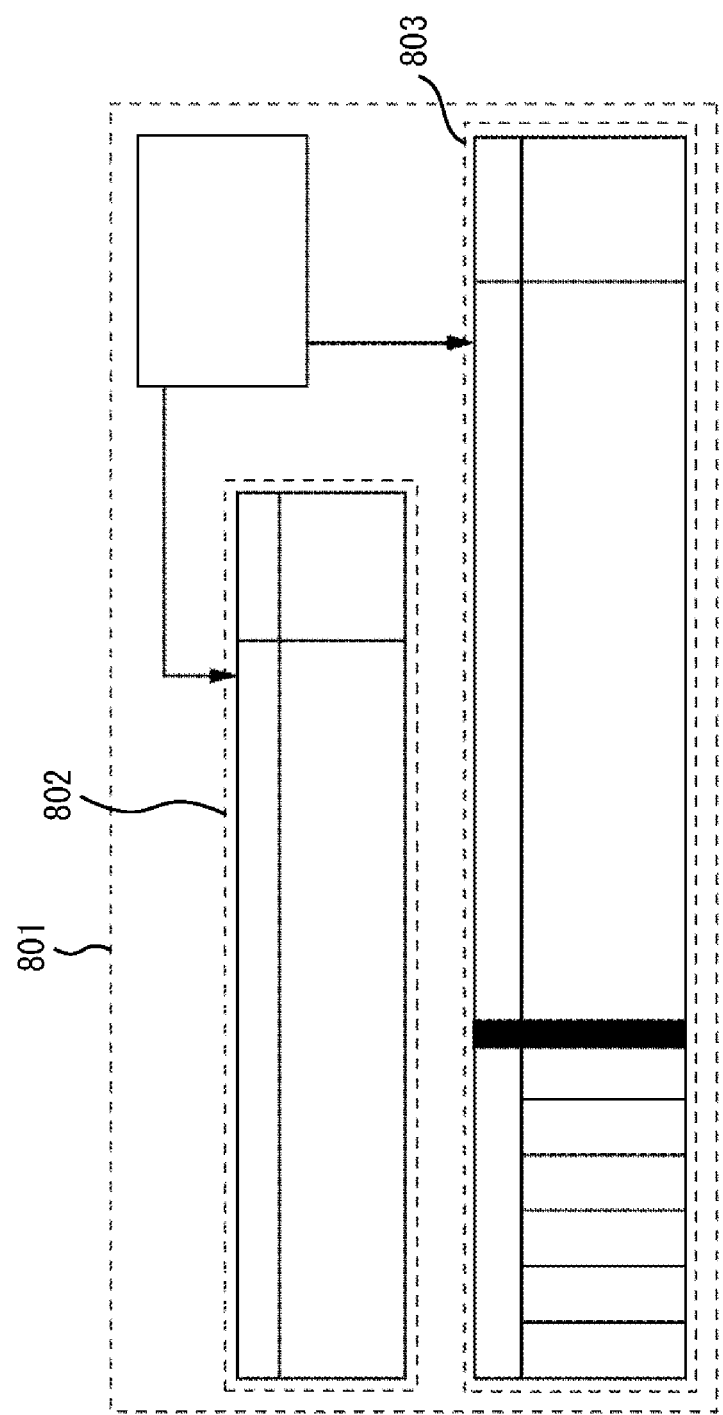
FIG. 8 illustrates an example of a region in which a table image is connected to another object.
Figure 9:
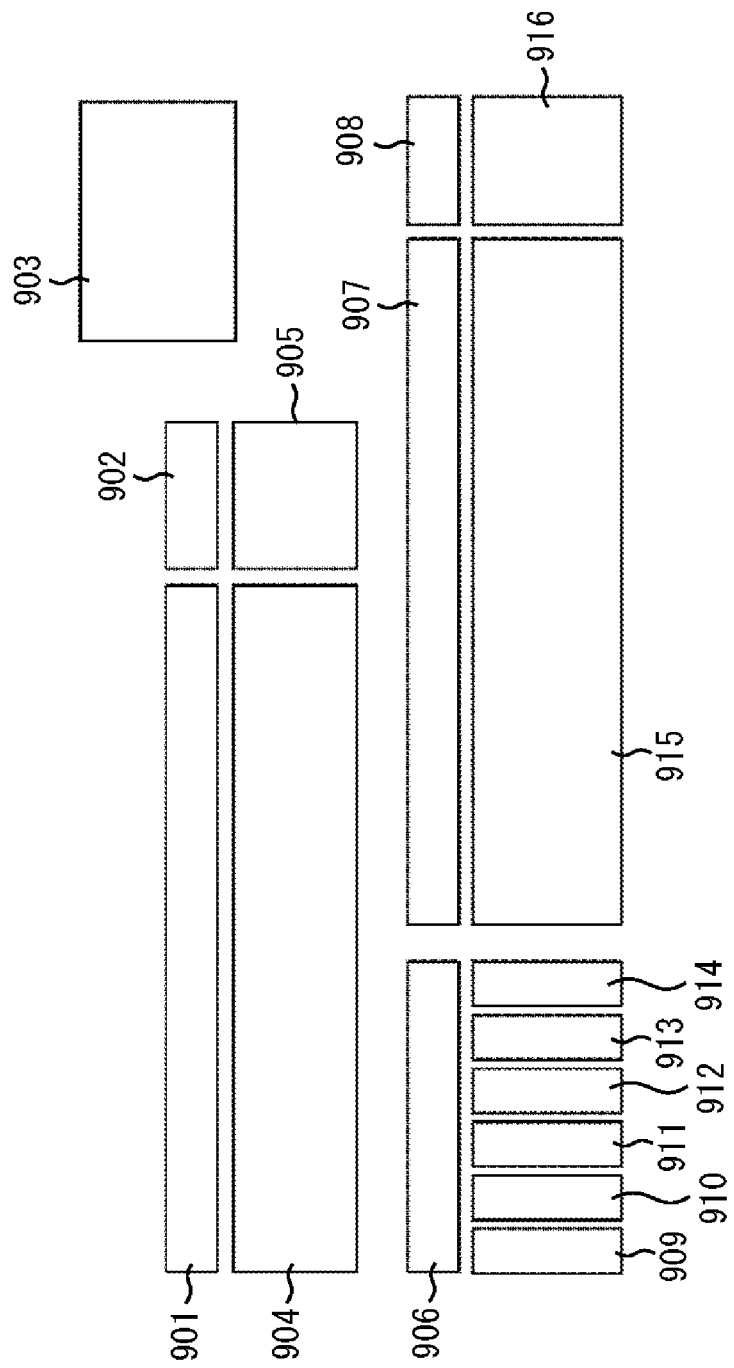
FIG. 9 illustrates internal regions included in the region illustrated in FIG. 8.
Figure 10:
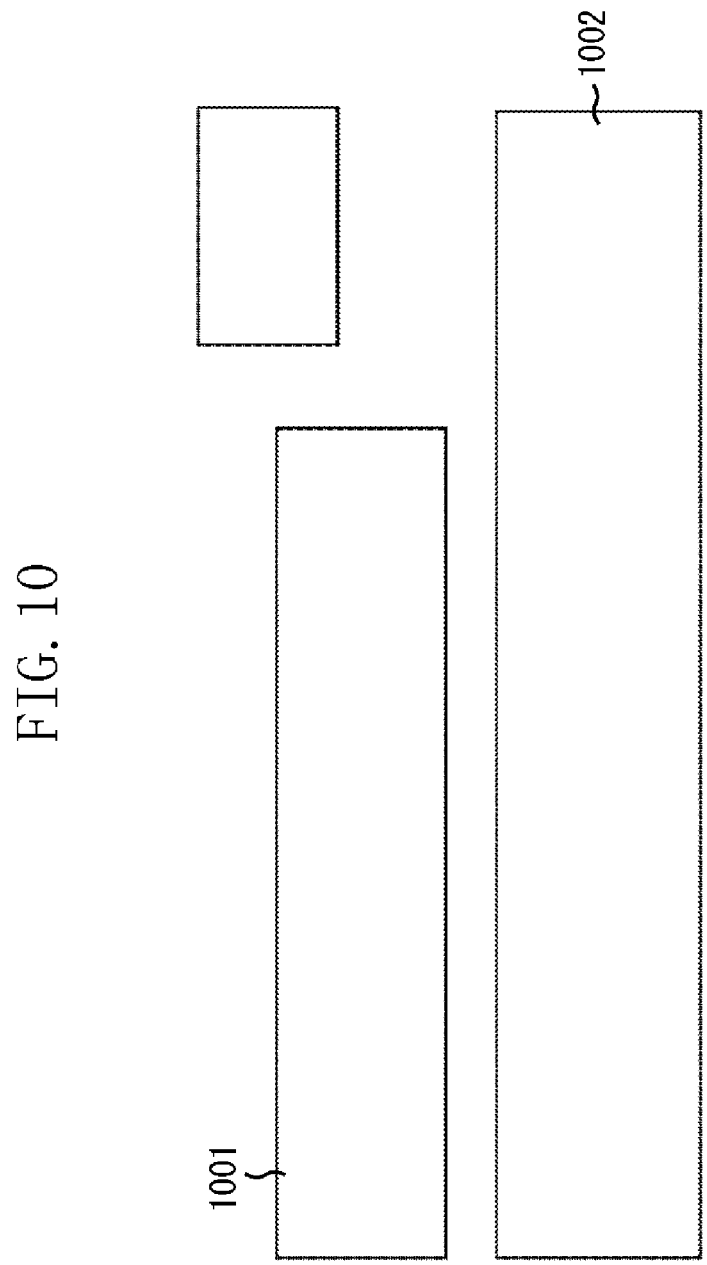
FIG. 10 illustrates a result of combining the internal regions illustrated in FIG. 9.

In step S1104, the CPU 101 extracts internal regions in the region selected in step S1103. When positions of the internal regions satisfy a predetermined condition, the internal regions are combined with one another. Subsequently, this combining processing is recursively repeated. However, this combining processing is finished when the combining of the internal regions is no longer performed. For example, internal regions included in a region indicated with dashed lines 501 are internal regions 601 through 609 illustrated in FIG. 6. When the internal region combining processing in step S1104 is performed on the internal regions illustrated in FIG. 6, the internal regions included in the region indicated with the dashed lines 501 (i.e., the internal regions 601 through 609) are combined with one another. Thus, combined internal regions 701 through 703 illustrated in FIG. 7 are generated. If a region indicated with dashed lines 801 in FIG. 8 is determined as one non-character region, a plurality of internal regions included in the region 801 is present, as designated with reference numerals 901 through 916 in FIG. 9. When the internal region combining processing in step S1104 is performed thereon, the internal regions located closely to one another are combined with one another. Thus, combined internal regions 1101 and 1102 are generated, as illustrated in FIG. 10. This processing is described in detail below.

The CPU 101 determines a processing target area, which is subjected to the determination processing in step S1105, based on each of the combined internal regions obtained by performing the combining. For example, the CPU 101 determines a region obtained by expanding each combined internal region by several pixels (e.g., 1 pixel) (or by a length which is several times each ruled line width) in upward, downward, leftward, and rightward directions as a processing target area. In step 1105, the CPU 101 performs table region determination processing on images of portions included in the processing target area based on a reference equivalent to that used in the table region determination in step S1102. More specifically, the CPU 101 performs extraction of connected regions of black pixels and extraction of connected regions of white pixels from images of portions included in the region determined on the basis of each combined internal region. Then, the CPU 101 determines whether each of the extracted regions has a table structure. In step S1106, the CPU 101 newly extracts images of portions included in each of the regions determined in step S1105 as table regions and discards region information obtained before this extraction of the images of the portions.

Figure 5:
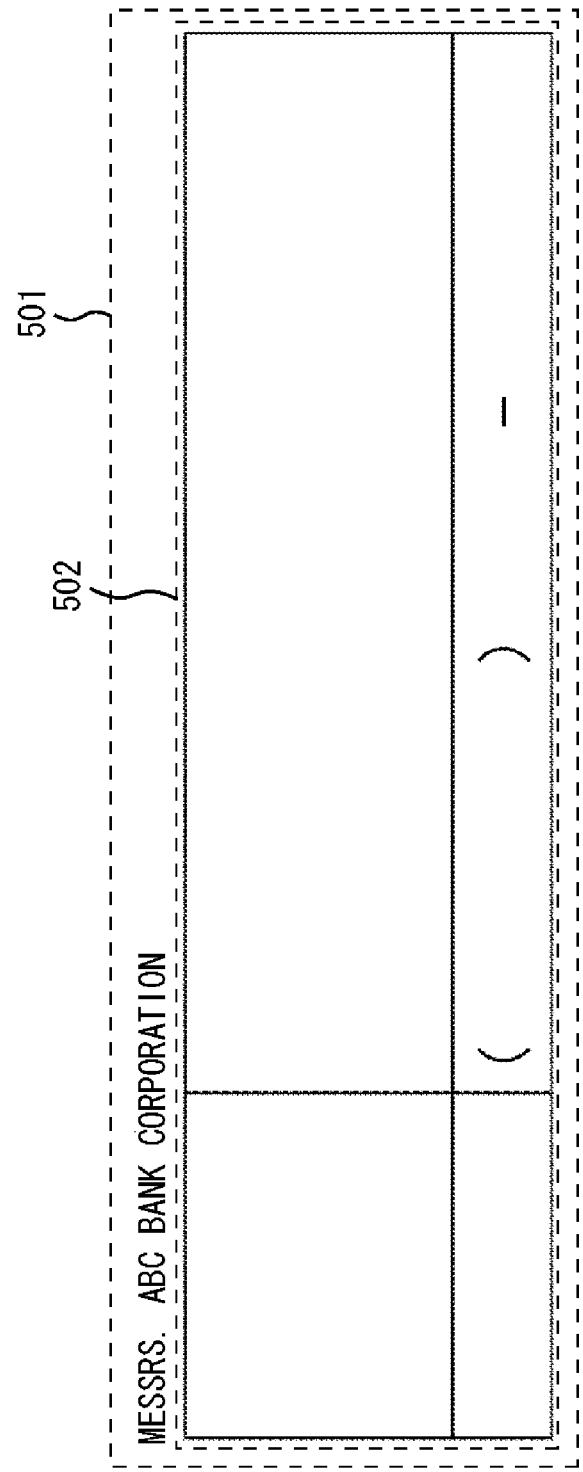
FIG. 5 illustrates an example of a table image to which a text image is connected.

If the CPU 101 performs the processing in each of steps S1102 through S1104 on, e.g., the images illustrated in FIG. 5, a combined internal region 703 illustrated in FIG. 7 is obtained. In step S1105, the CPU 101 determines a table region candidate in a region indicated with dashed lines 502 in FIG. 5, based on the combined internal region 703. Then, the CPU 101 determines whether images of portions included in the region 502 satisfy a condition for being determined as a table. Thus, the image of the portion, which satisfies such a condition, is extracted as an image of a table region. In the case of an example of an image illustrated in FIG. 8, images of portions (i.e., images of a region indicated with dashed lines 802 and a region indicated with dashed lines 803 in FIG. 8) respectively corresponding to combined internal regions 1001 and 1002 illustrated in FIG. 10 are extracted as table region images.

Figure 12:
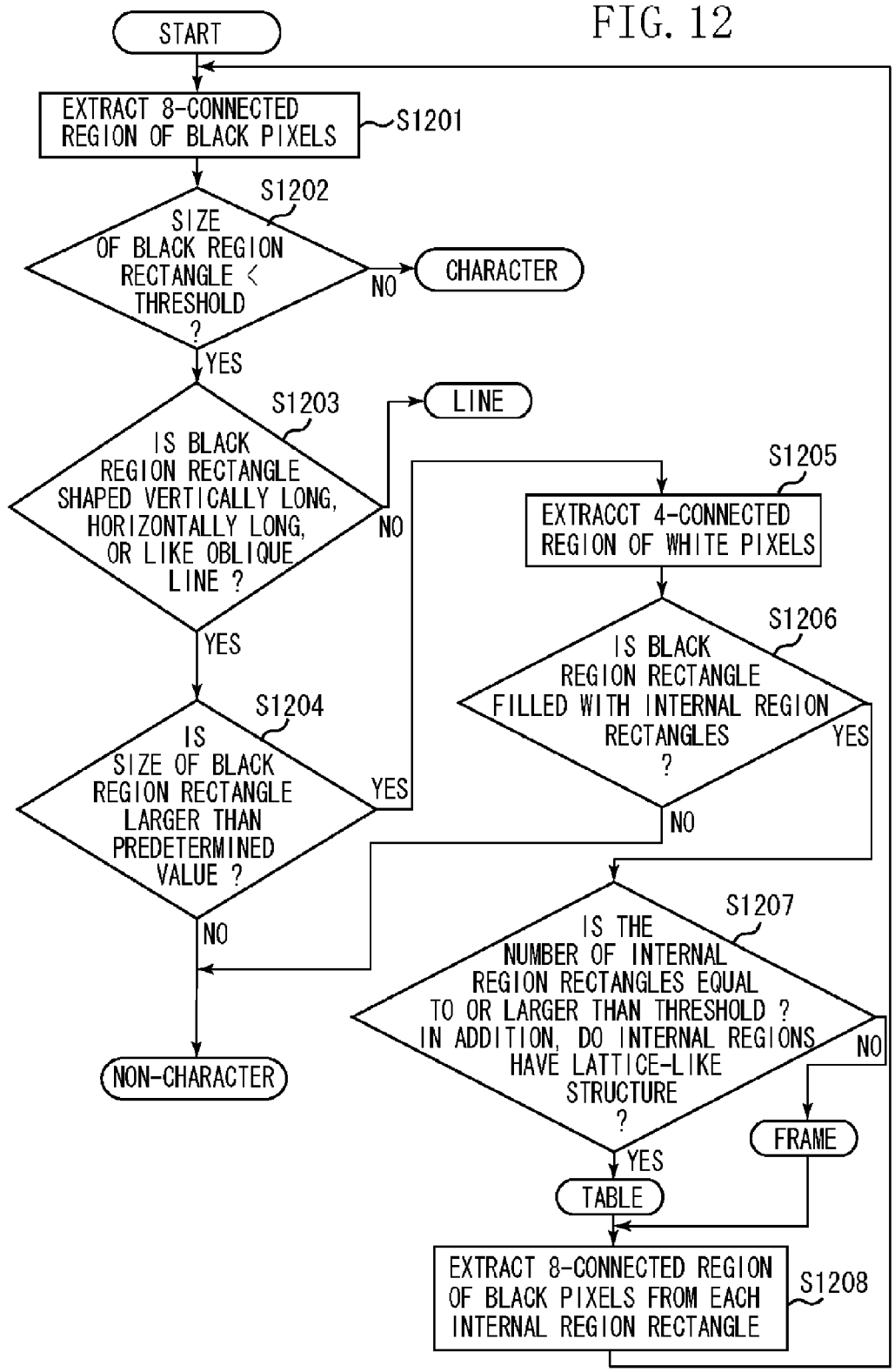
FIG. 12 is a flowchart illustrating a region segmentation process (table determination process) according to the exemplary embodiment of the present invention.

Next, the above region segmentation processing to be performed in step S1102 is described in detail hereinafter. FIG. 12 is a flowchart illustrating the region segmentation processing according to the present embodiment.

In step S1201, the CPU 101 extracts all 8-connected regions of black pixels from each image. The 8-connected region of black pixels is defined as a set of black pixels each of which is contacted with another black pixel of the set in at least one of longitudinal, transversal and diagonal directions, i.e., 8 directions, as illustrated in FIG. 13A. The 8-connected region of black pixels can be extracted by performing contour tracing of black pixels. Hereinafter, the 8-connected region of black pixels is referred to simply as a "black region". A black region is a minimum element constituting an object, such as a character or a table, in an image. A minimum rectangle (indicated as a dashed-line rectangle in FIG. 13A) enclosing this black region is referred to as a black region rectangle hereinafter.

In step S1202, the CPU 101 compares each of the height and the width of a black region rectangle with a threshold preliminarily determined based on a supposed height and a supposed width of a character. Then, the CPU 101 determines a black region enclosed by a black region rectangle, the height and the width of which is equal to or less than the threshold, as a "character". In step S1203, the CPU 101 determines a black region rectangle having a height and a width, a ratio between which is equal to or more than a predetermined value, i.e., a vertically-long or horizontally-long black region rectangle, as a "line". The CPU 101 determines also an oblique-line-like black region rectangle having a constant thickness as a "line". In step S1204, the CPU 101 determines whether the size of each black region rectangle is equal to or larger than a predetermined value. If the size of each black region rectangle satisfies this condition (YES in step S1204), the CPU 101 proceeds to step S1205. If the size of each black region rectangle does not satisfy this condition (NO in step S1204), the CPU 101 determines that the black region surrounded by this black region rectangle is a "non-character" object which is considered as a set of pixels including a figure, a photograph or a part thereof.

In step S1205, the CPU 101 extracts a set of 4-connected regions of white pixels which are present in the black region rectangle. The 4-connected regions of white pixels are defined as a set of white pixels each of which is contacted with another white pixel of the set in at least one of longitudinal and transversal directions, i.e., directions, as illustrated in FIG. 13B. The reason for applying the 4-connected region to the internal region of white pixels is that if contour tracing is performed by applying the 8-connected region to the internal region, a pixel determined to constitute a contour is out of a black pixel block in an oblique line portion. When 8-connected regions of black pixels are extracted from the image illustrated in FIG. 13A, each black-pixel portion is extracted as one region. On the other hand, when 4-connected regions of white pixels are extracted from the image illustrated in FIG. 13B, each white-pixel portion is extracted as two regions. Each of minimum rectangles respectively surrounding the two regions of white pixels is referred to as an internal region rectangle (indicated as a dashed-line rectangle in FIG. 13B).

As a result of performing the processing in step S1205, one or a plurality of internal region rectangles is extracted from the black region rectangle. In step S1206, the CPU 101 determines whether the inside of the black region rectangle is substantially filled with the extracted internal region rectangles without overlapping. If the CPU 101 determines that this condition is satisfied (YES in step S1206), the CPU 101 proceeds to step S1207. If the CPU 101 determines that this condition is not satisfied (NO in step S1206), the CPU 101 determines that the black region enclosed by this black region rectangle is a "non-character" object. For example, in each of cases illustrated in FIGS. 14A and 14B, internal region rectangles are extracted without overlap. However, in the case illustrated in FIG. 14C, the internal region rectangles are extracted in a state, in which these internal region rectangles overlap with one another, and are determined as a "non-character (or figure)" object.

In step S1207, the CPU 101 determines whether the number of internal region rectangles is equal to or greater than a predetermined threshold, and whether the internal regions have a lattice-like structure extending in both of horizontal and vertical directions. If the internal regions of the black region satisfy these conditions (YES in step S1207), this black region is determined as a "table" region. On the other hand, if the internal regions of the black region do not satisfy these conditions (NO in step S1207), this black region is determined as a "frame" region. If the internal regions have a lattice-like structure, usually, the position of the leftmost coordinate of the internal regions aligned in a line in an up-down direction is substantially the same as that of the rightmost coordinate of the internal regions. In addition, usually, the position of the top coordinate of the internal regions aligned in a line in a lateral direction is substantially the same as that of the bottom coordinate of the internal regions. Accordingly, the CPU 101 can determine, based on the positions of the coordinates of the internal regions, whether the internal regions have a lattice-like structure. For example, generally, in a case where the internal regions are connected if the positions of the coordinates (or boundaries) of the internal regions (or white contours) do not coincide, as discussed in U.S. Pat. No. 5,680,479, internal regions constituting a table region are not likely to be connected. Accordingly, in a case where a rate at which the internal regions included in the black region are connected to one another is low, and where the number of the connected internal regions is large, the black region can be determined as a table region.

In step S1208, the CPU 101 extracts 8-connected regions of black pixels again from images within a range of each of internal region rectangles that correspond to frame regions and table regions. Subsequently, the processing to be performed in step S1202 or later is repeatedly performed on a set of the extracted black regions. The present processing is finished when this recursive search is no longer performed.

Figure 15:
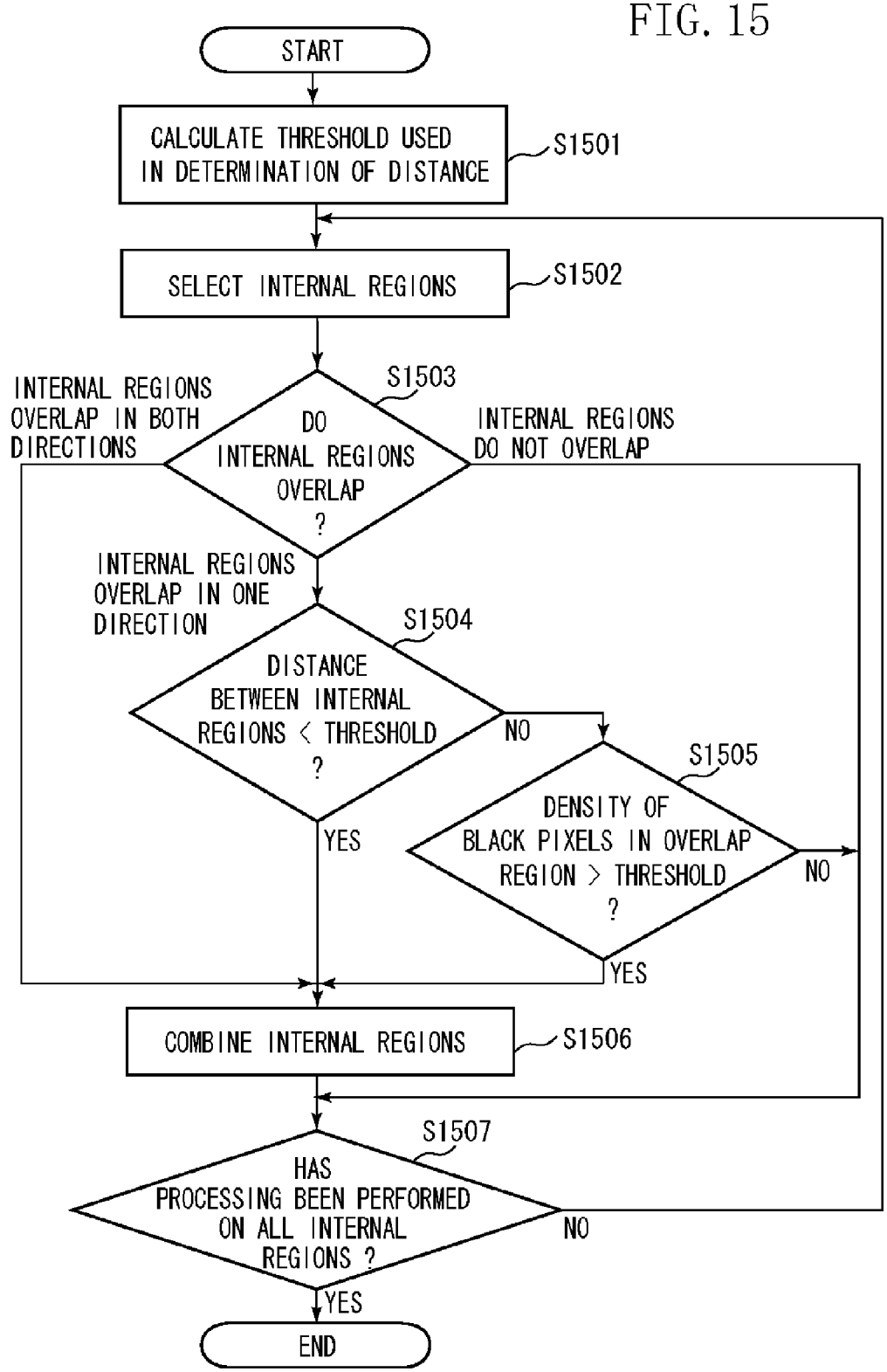
FIG. 15 is a flowchart illustrating an internal region combining process according to the exemplary embodiment of the present invention.

Next, the above internal region combining processing to be performed in step S1104 is described in detail hereinafter. FIG. 15 is a flowchart illustrating the internal region combining processing according to the present embodiment.

Figure 16:
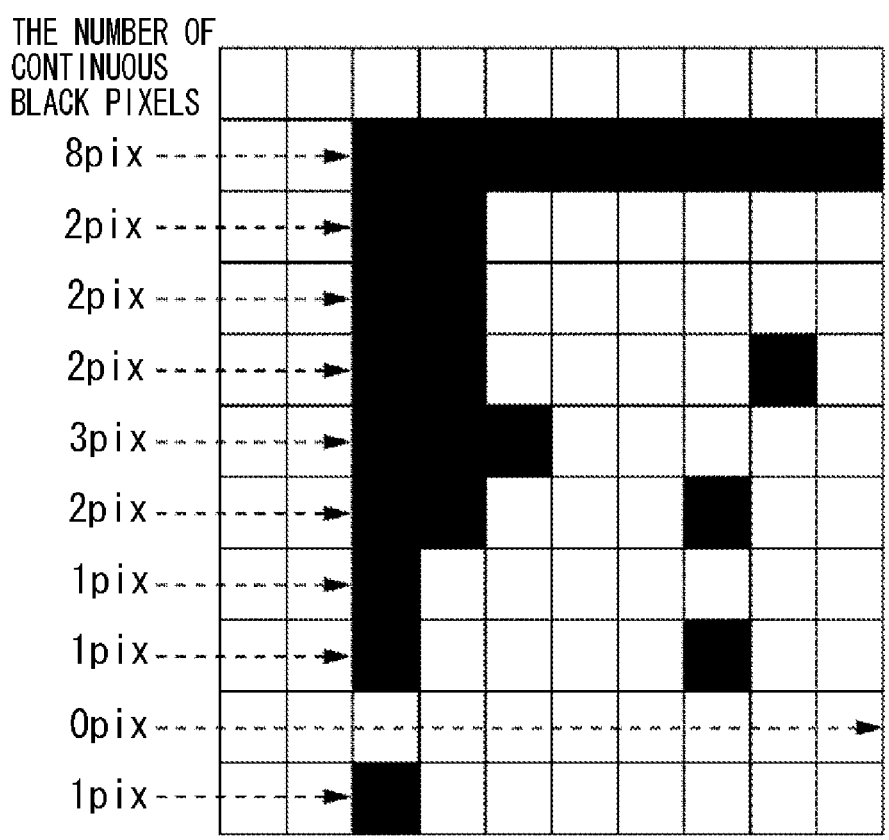
FIG. 16 illustrates how to calculate a thickness of a frame line (or a width of a ruled line).

In step S1501, the CPU 101 calculates a threshold to be used in distance determination performed in step S1504 which is described below. As indicated by dashed arrows in FIG. 16, black pixels are searched for in a horizontal direction from the left end to the right end of the region selected in step S1103. The CPU 101 counts continuous black pixels continued from the black pixel first detected. The above processing is performed on all lines of pixels. In the case illustrated in FIG. 16, the number of continuous black pixels from the black pixel first detected on a second line is 8. Upon completion of this processing from the left end of this line, similar processing is performed on the same line from the right end to the left end to calculate the number of continuous black pixels. Similarly, the number of continuous black pixels is counted vertically from the top to the bottom thereof and from the bottom to the top thereof. Then, an average value of the counted numbers of continuous black pixels is set as the threshold. Thus, this threshold is close to the line width of the table ruled line (i.e., a value larger than an average line width of the ruled line by several pixels). Although the threshold is dynamically calculated according to the image in the present embodiment, as described above, a predetermined value can be used as the threshold if the line width of the ruled line is preliminarily known.

In step S1502, the CPU 101 selects two internal regions as processing targets. For example, the internal regions are selected as the processing targets sequentially from the internal region located at a leftwardly upper position in the figure. Desirably, first, one of the internal regions is selected as a processing target. In addition, another internal region located in the vicinity of the internal region first selected as the processing target is selected as an additional processing target.

In step S1503, the CPU 101 compares the vertical coordinate position and the horizontal coordinate position of each of the internal regions selected as the processing targets to determine whether the selected internal regions overlap in each of the vertical direction and in the horizontal direction. According to the present embodiment, the expression "overlapping in a vertical direction" of the internal regions 1 and 2 means that overlap is found between the coordinate positions from a vertical starting point to a vertical ending point of the internal region 1, and the coordinate positions from a vertical starting point to a vertical ending point of the internal region 2, as illustrated in FIG. 17A, as a result of comparison therebetween. The expression "overlapping in a horizontal direction" of the internal regions 1 and 2 means that overlap is found between the coordinate positions from a horizontal starting point to a horizontal ending point of the internal region 1, and the coordinate positions from a horizontal starting point to a horizontal ending point of the internal region 2, as illustrated in FIG. 17B, as a result of comparison therebetween. If it is determined that overlap is found in one of the horizontal direction and the vertical direction, the CPU 101 proceeds to step S1504. If it is determined that both of overlaps are found in the horizontal direction and in the vertical direction, the CPU 101 proceeds to step S1506. If it is determined that there is no overlap (there is neither overlap in the horizontal direction nor overlap in the vertical direction), the CPU 101 proceeds to step S1507. FIG. 17C illustrates an example in which the internal regions overlap in both of the horizontal direction and the vertical direction. FIG. 17D illustrates an example in which the internal regions do not overlap.

In step S1504, the CPU 101 determines whether the internal regions of the processing target adjoin each other. First, the CPU 101 obtains a distance K between the corresponding sides of the internal regions (i.e., a horizontal distance K in the case where the internal regions overlap in the vertical direction, as illustrated in FIG. 17A, or a vertical distance K in a case where the internal regions overlap in the horizontal direction, as illustrated in FIG. 17B). If the distance K is equal to or less than the threshold calculated in step S1501 (YES in step S1504), the CPU 101 determines that the internal regions of this processing target adjoin each other. If the CPU 101 determines that the internal regions adjoin each other, the CPU 101 proceeds to step S1506. If the CPU 101 determines that the internal regions do not adjoin each other (NO in step S1504), the CPU 101 proceeds to step S1505. More specifically, if the CPU 101 determines that the internal regions are separated from each other by a distance substantially equal to the line width of the ruled line, the CPU 101 determines that the internal regions adjoin each other. Thus, the CPU 101 sets such internal regions as connection targets.

In step S1505, the CPU 101 determines a density of an image in an overlap region between the internal regions. First, the CPU 101 obtains the density of black pixels in an overlap region (i.e., an overlap region a in a case where the internal regions overlap in the vertical direction, as illustrated in FIG. 17A, or an overlap region b in a case where the internal regions overlap in the horizontal direction, as illustrated in FIG. 17B) between the internal regions. Then, if the density of black pixels is equal to or higher than a certain threshold (YES in step S1505), the CPU 101 sets the internal regions as connection targets. Then, the CPU 101 proceeds to step S1506. On the other hand, if the density of black pixels is less than a certain threshold (NO in step S1505), the CPU 101 does not set the internal regions as connection targets. Then, the CPU 101 proceeds to step S1507. More specifically, if it is determined that the internal regions are separated from each other by a distance than the average line width of the ruled line, and that a thick ruled line is present between the internal regions, the CPU 101 sets the internal regions as connection targets. For example, as is seen from FIG. 8, a space between regions 914 and 915 illustrated in FIG. 9 is filled with black pixels. Therefore, the regions 914 and 915 are connection targets. However, if it is found in step 1505 that the distance between the internal regions is too large (to the extent that the ruled line extending therebetween cannot be regarded as being thick) even when the density of black pixels is high, the CPU 101 does not set the internal regions as connection targets. Then, the CPU 101 proceeds to step S1507.

In step S1506, the CPU 101 connects the internal regions, which are processing targets, to each other to generate a combined internal region. In step S1507, the CPU 101 determines whether the determination has been performed on all internal regions serving as processing targets. If the CPU 101 determines that there is still an internal region on which the determination is not performed, the CPU 101 returns to step S1501. Then, the above process is recursively repeated by employing the internal region, on which the determination is not performed, as processing target. When the process including steps S1501 through S1507 is finished, a final combined internal region is generated.

For example, internal regions extracted from the image as illustrated in FIG. 8 are obtained, as illustrated in FIG. 9. When the combining processing is performed on this internal region, combined internal regions 1001 and 1002 illustrated in FIG. 10 are obtained. Then, when table region determination is performed, images of portions included in the regions 802 and 803 are determined as table images. Thus, table regions are extracted. More specifically, in the case illustrated in FIG. 8, although the region 801 extracted by the processing performed in step S1102 is not determined as a table region, the regions 802 and 803 extracted by the processing performed in step S1104 are extracted as table regions, respectively.

In the case of the image illustrated in FIG. 5, sometimes, the region 501 extracted by the processing in step S1102 is in a state in which an extra character string is added to the table region. However, the table region can be extracted more accurately owing to the region 502 that is extracted by performing the processing in step S1104.

The table region extracted in this manner can be utilized in various image processing such as form recognition processing for determining a form type, and determination of a target area for character recognition.

According to the present embodiment, processing to be performed in each step of the above-described flowchart is implemented by executing a program code with a computer. However, the implementation of each step according to the present invention is not limited thereto. For example, a part or all of the processing to be performed in each step can be implemented by hardware, such as an electronic circuit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-159319 filed Jun. 18, 2008, which is hereby incorporated by reference herein in its entirety.

What is claimed is:

1. An image processing apparatus comprising:
a region segmentation unit configured to perform region segmentation processing which extracts black pixel connected regions from a document image;
a selection unit configured to select a processing target region from the regions extracted by the region segmentation unit;
an internal region combining unit configured to extract internal regions from the processing target regions, and configured to generate a combined internal region by combining the internal regions which are included in the processing target region selected by the selection unit and satisfy a predetermined condition, wherein the internal regions are white pixel connected regions;
a table region determination unit configured to determine whether a region obtained based on the combined internal region generated by the internal region combining unit is a table region; and
an extraction unit configured to extract the region determined by the table region determination unit as a table region.

2. The image processing apparatus according to claim 1, wherein the internal region combining unit combines the internal regions in a case where the internal regions overlap in one of a horizontal direction and a vertical direction, and where a distance between the internal regions is equal to or less than a predetermined threshold.

3. The image processing apparatus according to claim 2, wherein the threshold is calculated based on the number of connected black pixels in the processing target region selected by the selection unit.

4. The image processing apparatus according to claim 1, wherein the internal region combining unit combines the internal regions in a case where the internal regions overlap in both of a horizontal direction and a vertical direction.

5. The image processing apparatus according to claim 1, wherein the internal region combining unit combines the internal regions in a case where the internal regions overlap in one of a horizontal direction and a vertical direction, and where a density of an overlap between the internal regions is equal to or higher than a predetermined threshold.

6. An image processing method comprising:
performing region segmentation processing which extracts black pixel connected regions from a document image;
selecting a processing target region from the regions extracted by the region segmentation;
extracting internal regions from the processing target regions, and configured to generate a combined internal region by combining the internal regions which are included in the processing target region selected and satisfy a predetermined condition, wherein the internal regions are white pixel connected regions;
determining whether a region obtained based on the combined internal region is a table region; and
extracting the region determined as a table region.

7. The image processing method according to claim 6, further comprising:
combining the internal regions in a case where the internal regions overlap in one of a horizontal direction and a vertical direction, and where a distance between the internal regions is equal to or less than a predetermined threshold.

8. The image processing method according to claim 7, wherein the threshold is calculated based on the number of connected black pixels in the processing target region selected by the selection unit.

9. The image processing method according to claim 6, further comprising:
combining the internal regions in a case where the internal regions overlap in both of a horizontal direction and a vertical direction.

10. The image processing method according to claim 6, further comprising:
combining the internal regions in a case where the internal regions overlap in one of a horizontal direction and a vertical direction, and where a density of an overlap between the internal regions is equal to or higher than a predetermined threshold.

11. A non-transitory computer-readable storage medium storing a computer program, the computer program including program codes for causing a computer to perform operations, comprising:
performing region segmentation processing which extracts black pixel connected regions from a document image;
selecting a processing target region from the regions extracted by the region segmentation;
extracting internal regions from the processing target regions, and configured to generate a combined internal region by combining the internal regions which are included in the processing target region selected and satisfy a predetermined condition, wherein the internal regions are white pixel connected regions;
determining whether a region obtained based on the combined internal region is a table region; and
extracting the region determined as a table region.

12. The storage medium according to claim 11, wherein the operations further comprising:

combining the internal regions in a case where the internal regions overlap in one of a horizontal direction and a vertical direction, and where a distance between the internal regions is equal to or less than a predetermined threshold.

13. The storage medium according to claim 12, wherein the threshold is calculated based on the number of connected black pixels in the processing target region selected by the selection unit.

14. The storage medium according to claim 11, wherein the operations further comprising:
    combining the internal regions in a case where the internal regions overlap in both of a horizontal direction and a vertical direction.

15. The storage medium according to claim 11, wherein the operations further comprising:
    combining the internal regions in a case where the internal regions overlap in one of a horizontal direction and a vertical direction, and where a density of an overlap portion between the internal regions is equal to or higher than a predetermined threshold.

* * * * *